United States Patent
Hall et al.

(10) Patent No.: US 6,817,280 B2
(45) Date of Patent: Nov. 16, 2004

(54) SYSTEM AND METHOD FOR BREWING BEVERAGES

(75) Inventors: Robert C. Hall, Mountain View, CA (US); Gary L. Waymire, Menlo Park, CA (US); Michael R. Barry, Palo Alto, CA (US); Shane Washburn, San Leandro, CA (US)

(73) Assignee: BrewBot, Inc., San Carlos, CA (US)

( * ) Notice: Subject to any disclaimer, the term of this patent is extended or adjusted under 35 U.S.C. 154(b) by 0 days.

(21) Appl. No.: 10/390,805

(22) Filed: Mar. 18, 2003

(65) Prior Publication Data

US 2003/0213369 A1 Nov. 20, 2003

Related U.S. Application Data

(60) Provisional application No. 60/370,142, filed on Apr. 5, 2002, and provisional application No. 60/369,275, filed on Apr. 2, 2002.

(51) Int. Cl.[7] .............................................. A47J 31/043
(52) U.S. Cl. ........................................ 99/292; 99/303
(58) Field of Search .................................... 99/292, 303

(56) References Cited

U.S. PATENT DOCUMENTS

| | | |
|---|---|---|
| 24,795 A | 7/1859 | Chesterman |
| 55,509 A | 6/1866 | Liesche |
| 58,396 A | 10/1866 | Edson |
| 61,122 A | 1/1867 | Tilden |
| 74,937 A | 2/1868 | Petsch et al. |
| 75,045 A | 3/1868 | Nason |
| 109,901 A | 12/1870 | Hildenbrand |
| 210,483 A | 12/1878 | Antunes |
| 285,964 A | 10/1883 | Brannen |
| 386,817 A | 7/1888 | Harry |
| 612,883 A | 10/1898 | Van Marter |
| 725,193 A | 4/1903 | Atkins |
| 865,776 A | 9/1907 | Georg |
| 871,491 A | 11/1907 | Dunlap |
| 881,570 A | 3/1908 | Giovanna |
| 951,626 A | 3/1910 | Bachelder |
| 1,040,595 A | 10/1912 | Warner |

(List continued on next page.)

Primary Examiner—Reginald L. Alexander
(74) Attorney, Agent, or Firm—Fliesler Meyer LLP

(57) ABSTRACT

Systems and methods for brewing beverages in accordance with the present invention can improve the flavor of brewed beverages and reduce the vertical space required for a system using suction. One such assembly comprises a brewing chamber adapted to hold a filter having an intake duct for receiving fluid for brewing, and an output duct for expelling a brewed beverage. The brewing chamber is positioned above a pressurizable container, or carafe, having an adjustable standpipe and containing the fluid. The carafe has a heated base, which when heated causes pressure to build up, forcing the fluid up the standpipe, through a check valve, through the intake duct and into the filter. Once substantially all of the fluid has been urged into the brew chamber, the heat is removed, creating a partial vacuum that pulls the brewed beverage back into the carafe. This description is not intended to be a complete description of, or limit the scope of, the invention. Other features, aspects, and objects of the invention can be obtained from a review of the specification, the figures, and the claims.

13 Claims, 5 Drawing Sheets

U.S. PATENT DOCUMENTS

| | | |
|---|---|---|
| 1,043,487 A | 11/1912 | Warner |
| 1,068,212 A | 7/1913 | Bodascher |
| D45,585 S | 4/1914 | Cohn |
| D46,523 S | 10/1914 | Behrend |
| 1,121,399 A | 12/1914 | Riccaiardelli |
| D47,545 S | 7/1915 | Ricciardeli et al. |
| D47,681 S | 8/1915 | Allen, Jr. |
| 1,157,778 A | 10/1915 | Hemming et al. |
| 1,167,259 A | 1/1916 | Bleichrode |
| 1,168,988 A | 1/1916 | Zimmermann |
| 1,169,013 A | 1/1916 | Darling |
| D48,942 S | 4/1916 | Kohn |
| 1,180,881 A | 4/1916 | Ricciardelli |
| 1,186,318 A | 6/1916 | Kohn |
| 1,203,661 A | 11/1916 | Task |
| 1,232,808 A | 7/1917 | Kalina |
| D51,199 S | 8/1917 | Curtiss |
| 1,259,471 A | 3/1918 | Bachelder |
| 1,264,868 A | 4/1918 | Carlson |
| 1,288,376 A | 12/1918 | Bleichrode |
| 1,306,415 A | 6/1919 | Dunlap |
| 1,406,814 A | 2/1922 | Baker |
| 1,479,245 A | 1/1924 | Kelly |
| 1,494,691 A | 5/1924 | Loggie et al. |
| 1,507,587 A | 9/1924 | Curtiss |
| 1,527,962 A | 2/1925 | Lamb |
| D67,584 S | 6/1925 | Dunn |
| 1,561,893 A | 11/1925 | Williams |
| 1,634,705 A | 7/1927 | Bridges |
| 1,652,955 A | 12/1927 | Price |
| 1,674,857 A | 6/1928 | Emerson |
| 1,702,243 A | 2/1929 | Axtell |
| D80,013 S | 12/1929 | Boever |
| D80,014 S | 12/1929 | Boever |
| D80,015 S | 12/1929 | Boever |
| D81,912 S | 9/1930 | Boever |
| D81,913 S | 9/1930 | Boever |
| D81,914 S | 9/1930 | Boever |
| 1,774,927 A | 9/1930 | Lambert |
| 1,794,639 A | 3/1931 | Nevius |
| D84,962 S | 8/1931 | Smith |
| 1,822,238 A | 9/1931 | Sacco-Albanese |
| D85,292 S | 10/1931 | LaFollette et al. |
| D85,966 S | 1/1932 | Wolcott |
| 1,843,476 A | 2/1932 | Boever |
| D86,426 S | 3/1932 | Wolcott |
| D86,427 S | 3/1932 | Wolcott |
| D86,428 S | 3/1932 | Wolcott |
| D86,429 S | 3/1932 | Wolcott |
| D86,430 S | 3/1932 | Wolcott |
| 1,857,899 A | 5/1932 | Walder |
| 1,857,900 A | 5/1932 | Walder |
| 1,857,906 A | 5/1932 | Wolcott et al. |
| 1,857,923 A | 5/1932 | Lucia |
| 1,859,614 A | 5/1932 | Boever |
| D87,179 S | 6/1932 | Wolcott |
| D87,180 S | 6/1932 | Wolcott |
| D87,181 S | 6/1932 | Wolcott |
| D87,182 S | 6/1932 | Wolcott |
| D87,183 S | 6/1932 | Wolcott |
| D87,298 S | 7/1932 | Anderson et al. |
| D87,496 S | 8/1932 | Willmott |
| D87,655 S | 8/1932 | Wolcott |
| D87,656 S | 8/1932 | Wolcott |
| D87,657 S | 8/1932 | Wolcott |
| 1,872,802 A | 8/1932 | Perlman |
| D90,024 S | 5/1933 | Fukal |
| D90,026 S | 5/1933 | Fukal |
| D90,027 S | 5/1933 | Fukal |
| 1,918,117 A | 7/1933 | Martin |
| 1,920,121 A | 7/1933 | Baughman |
| 1,924,011 A | 8/1933 | Willmott |
| 1,927,287 A | 9/1933 | Kell et al. |
| D90,884 S | 10/1933 | Hadley |
| 1,931,076 A | 10/1933 | Kell et al. |
| 1,934,070 A | 11/1933 | Jenkins |
| 1,935,587 A | 11/1933 | Blau |
| 1,947,426 A | 2/1934 | Smith |
| D91,774 S | 3/1934 | Fukal |
| D91,814 S | 3/1934 | Fukal |
| D91,869 S | 4/1934 | Fukal |
| 1,956,662 A | 5/1934 | Wolcott |
| 1,956,663 A | 5/1934 | Wolcott |
| D92,668 S | 7/1934 | McArdle |
| 1,967,811 A | 7/1934 | Cory |
| 1,967,982 A | 7/1934 | Wolcott |
| 1,967,983 A | 7/1934 | Wolcott |
| 1,967,984 A | 7/1934 | Wolcott |
| 1,967,985 A | 7/1934 | Wolcott |
| 1,967,986 A | 7/1934 | Wolcott |
| 1,976,620 A | 10/1934 | MacBeth |
| 1,977,364 A | 10/1934 | Wolcott |
| 1,977,365 A | 10/1934 | Wolcott |
| 1,977,366 A | 10/1934 | Wolcott |
| 1,977,367 A | 10/1934 | Wolcott |
| 1,978,074 A | 10/1934 | Bogoslowsky |
| D93,957 S | 11/1934 | Wolcott |
| D93,958 S | 11/1934 | Wolcott |
| D94,164 S | 12/1934 | Samuels |
| 1,983,208 A | 12/1934 | Boever |
| 1,983,209 A | 12/1934 | Wolcott |
| 1,983,210 A | 12/1934 | Wolcott |
| 1,983,211 A | 12/1934 | Wolcott |
| 1,983,212 A | 12/1934 | Wolcott |
| D94,194 S | 1/1935 | Ehrenreich |
| 1,986,957 A | 1/1935 | Ehrenreich |
| 1,989,034 A | 1/1935 | Anderson et al. |
| 1,994,323 A | 3/1935 | Peirce |
| 2,004,883 A | 6/1935 | Wolcott |
| 2,015,983 A | 10/1935 | Wolcott |
| 2,027,481 A | 1/1936 | Ireland |
| 2,027,826 A | 1/1936 | Keaton |
| 2,028,033 A | 1/1936 | Wolcott |
| 2,032,317 A | 2/1936 | Frank |
| 2,038,119 A | 4/1936 | Masin et al. |
| 2,044,566 A | 6/1936 | Cory |
| D100,263 S | 7/1936 | Fukal |
| D100,270 S | 7/1936 | Koci |
| D100,321 S | 7/1936 | Farber |
| D100,553 S | 7/1936 | Farber |
| D100,554 S | 7/1936 | Farber |
| 2,053,451 A | 9/1936 | Umstott |
| 2,054,999 A | 9/1936 | Wolcott |
| 2,058,136 A | 10/1936 | Cory |
| D103,307 S | 2/1937 | Cory |
| 2,069,939 A | 2/1937 | Browning |
| 2,071,919 A | 2/1937 | Cory |
| 2,072,324 A | 3/1937 | Wolcott |
| 2,072,934 A | 3/1937 | Wolcott |
| 2,072,935 A | 3/1937 | Wolcott |
| D104,158 S | 4/1937 | Farber |
| 2,078,682 A | 4/1937 | Parr et al. |
| 2,084,602 A | 6/1937 | Stocker |
| 2,086,357 A | 7/1937 | Farber |
| 2,087,664 A | 7/1937 | Cory |
| 2,089,520 A | 8/1937 | Wolcott |
| 2,089,521 A | 8/1937 | Wolcott |
| 2,092,799 A | 9/1937 | Cory |
| 2,093,316 A | 9/1937 | Fowler |
| D106,778 S | 11/1937 | Anderson |
| 2,097,681 A | 11/1937 | Wolcott |

| | | | | | | |
|---|---|---|---|---|---|---|
| 2,097,825 A | 11/1937 | Wolcott | | 2,278,754 A | 4/1942 | Wolcott |
| 2,100,487 A | 11/1937 | Marsden | | 2,281,652 A | 5/1942 | Wolcott |
| D106,808 S | 12/1937 | Perlman | | 2,282,767 A | 5/1942 | Peterson |
| D107,847 S | 1/1938 | Abrams | | 2,284,359 A | 5/1942 | Bellows, Jr. |
| 2,107,236 A | 2/1938 | Cory | | 2,286,254 A | 6/1942 | Brault |
| 2,108,684 A | 2/1938 | Lynch | | 2,286,990 A | 6/1942 | Lehmann |
| 2,112,944 A | 4/1938 | Wolcott | | 2,287,571 A | 6/1942 | Purpura |
| 2,117,729 A | 5/1938 | Keaton | | 2,287,580 A | 6/1942 | Wagner |
| 2,123,327 A | 7/1938 | Biberthaler et al. | | 2,287,582 A | 6/1942 | Wagner |
| 2,126,584 A | 8/1938 | Small | | 2,287,583 A | 6/1942 | Weeks |
| 2,129,587 A | 9/1938 | Nevius | | 2,287,584 A | 6/1942 | Weeks |
| 2,133,178 A | 10/1938 | Sieling | | 2,287,585 A | 6/1942 | Weeks |
| 2,135,102 A | 11/1938 | Charlston | | D132,983 S | 7/1942 | Foster |
| 2,135,543 A | 11/1938 | Taxay | | 2,289,498 A | 7/1942 | Hons, Jr. |
| 2,137,884 A | 11/1938 | Weeks | | 2,291,427 A | 7/1942 | Wolcott |
| 2,138,198 A | 11/1938 | Weber et al. | | 2,293,483 A | 8/1942 | Allenby |
| D113,512 S | 2/1939 | Iannelli | | D134,164 S | 10/1942 | Peterson |
| D113,513 S | 2/1939 | Iannelli | | 2,298,854 A | 10/1942 | Wolcott |
| D113,514 S | 2/1939 | Iannelli | | 2,300,606 A | 11/1942 | Wolcott |
| 2,150,492 A | 3/1939 | Cory | | 2,301,917 A | 11/1942 | Johnson |
| 2,150,801 A | 3/1939 | Keaton | | 2,305,492 A | 12/1942 | Poglein |
| 2,151,407 A | 3/1939 | Lobl | | D134,823 S | 1/1943 | Barbiers |
| D114,097 S | 4/1939 | Cory | | 2,312,555 A | 3/1943 | Jepson |
| D114,364 S | 4/1939 | Farber | | 2,312,556 A | 3/1943 | Jepson |
| 2,154,963 A | 4/1939 | Swager | | 2,313,112 A | 3/1943 | Wolcott |
| D114,692 S | 5/1939 | Wolcott | | 2,314,018 A | 3/1943 | Sanderson |
| 2,158,133 A | 5/1939 | Lemp | | 2,314,543 A | 3/1943 | Kopf |
| 2,158,587 A | 5/1939 | Nevius | | 2,315,473 A | 3/1943 | Wolcott |
| D115,226 S | 6/1939 | Wolcott | | 2,321,411 A | 6/1943 | Morse |
| 2,161,496 A | 6/1939 | Wolcott | | D136,200 S | 8/1943 | Alsdorf |
| 2,164,158 A | 6/1939 | Masin | | 2,325,912 A | 8/1943 | Lehmann |
| 2,167,255 A | 7/1939 | Warner | | D136,548 S | 10/1943 | Cory |
| 2,168,158 A | 8/1939 | Hall | | D136,404 S | 11/1943 | Wolcott |
| 2,171,321 A | 8/1939 | Miller | | 2,331,705 A | 11/1943 | Lehmann |
| 2,174,093 A | 9/1939 | Perlman | | 2,340,203 A | 1/1944 | Morse |
| 2,174,466 A | 9/1939 | Kell et al. | | 2,345,146 A | 3/1944 | Perliusz et al. |
| 2,175,440 A | 10/1939 | Masin | | 2,345,262 A | 3/1944 | Jepson et al. |
| 2,179,936 A | 11/1939 | Keene | | 2,345,264 A | 3/1944 | Jepson |
| 2,180,602 A | 11/1939 | Morgan | | 2,345,265 A | 3/1944 | Jepson et al. |
| 2,180,655 A | 11/1939 | Abbate | | 2,346,924 A | 4/1944 | Lehmann |
| 2,181,090 A | 11/1939 | Lucia | | D138,362 S | 7/1944 | Alsdorf |
| 2,181,578 A | 11/1939 | Cory | | 2,359,189 A | 9/1944 | Alsdorf |
| 2,187,974 A | 1/1940 | Johnson | | D139,214 S | 10/1944 | Peterson |
| 2,188,488 A | 1/1940 | Talmadge | | D139,219 S | 10/1944 | Wolcott |
| 2,188,493 A | 1/1940 | Becher | | 2,359,405 A | 10/1944 | Cory |
| 2,190,965 A | 2/1940 | Wood | | 2,360,569 A | 10/1944 | Masin |
| 2,211,414 A | 8/1940 | Francis | | D139,543 S | 11/1944 | Frick |
| 2,212,100 A | 8/1940 | Keaton | | 2,365,615 A | 12/1944 | Woodman |
| 2,212,320 A | 8/1940 | Kennard | | D140,457 S | 1/1945 | Chapman |
| 2,216,255 A | 10/1940 | Tate | | 2,366,951 A | 1/1945 | Aycock |
| 2,217,474 A | 10/1940 | Foster | | 2,370,096 A | 2/1945 | Walder et al. |
| 2,220,641 A | 11/1940 | Davis | | 2,370,674 A | 3/1945 | Lucia |
| 2,223,450 A | 12/1940 | Jepson et al. | | 2,373,987 A | 4/1945 | Wolcott et al. |
| 2,224,378 A | 12/1940 | Coniglio | | 2,376,410 A | 5/1945 | Wolper |
| 2,225,027 A | 12/1940 | Anders | | 2,381,104 A | 8/1945 | Burnham |
| D125,266 S | 2/1941 | Felver | | 2,381,151 A | 8/1945 | Wolcott |
| 2,230,479 A | 2/1941 | Becher | | 2,381,418 A | 8/1945 | Alsdorf |
| 2,230,901 A | 2/1941 | Nevius | | 2,382,594 A | 8/1945 | Wolcott |
| 2,234,678 A | 3/1941 | Matson | | 2,384,359 A | 9/1945 | Wolcott |
| 2,239,966 A | 4/1941 | Johnson | | 2,384,694 A | 9/1945 | Davis, Jr. |
| D129,591 S | 9/1941 | Krause | | 2,386,278 A | 10/1945 | Strother |
| 2,258,484 A | 10/1941 | Cory | | 2,386,433 A | 10/1945 | Carter et al. |
| 2,258,589 A | 10/1941 | Lehman | | 2,386,532 A | 10/1945 | Wolcott |
| 2,262,286 A | 11/1941 | Ireland | | 2,387,425 A | 10/1945 | Wolcott |
| 2,265,505 A | 12/1941 | Alverson | | 2,388,335 A | 11/1945 | McCullough |
| 2,265,615 A | 12/1941 | Stalter | | 2,389,740 A | 11/1945 | Reichart |
| 2,269,956 A | 1/1942 | Renner | | 2,390,269 A | 12/1945 | Peterson |
| 2,274,607 A | 2/1942 | Cohen | | D143,557 S | 1/1946 | Smith |
| 2,275,746 A | 3/1942 | Edwards | | D143,558 S | 1/1946 | Smith |
| 2,276,216 A | 3/1942 | Lehmann | | 2,392,358 A | 1/1946 | Blakeslee |
| 2,277,025 A | 3/1942 | Lehman | | 2,392,656 A | 1/1946 | Foster |

| | | |
|---|---|---|
| D144,728 S | 5/1946 | Pavelka, Jr. |
| D144,945 S | 6/1946 | Snyder |
| 2,402,163 A | 6/1946 | Huenergardt |
| 2,403,404 A | 7/1946 | Scott |
| 2,405,751 A | 8/1946 | McMenamin |
| D146,352 S | 2/1947 | Florian |
| 2,415,339 A | 2/1947 | Curtis |
| 2,416,149 A | 2/1947 | Botts |
| 2,424,544 A | 7/1947 | Alsdorf |
| 2,426,720 A | 9/1947 | Weinberg |
| 2,428,942 A | 10/1947 | Poglein |
| 2,434,122 A | 1/1948 | Reichold |
| D148,601 S | 2/1948 | Becher |
| D148,677 S | 2/1948 | Chapman |
| D148,734 S | 2/1948 | Tackenberg et al. |
| D149,171 S | 4/1948 | Cohen |
| 2,442,096 A | 5/1948 | Roney |
| 2,445,591 A | 7/1948 | Sullivan |
| D150,482 S | 8/1948 | Wohl |
| 2,446,499 A | 8/1948 | Van Denberg |
| 2,449,619 A | 9/1948 | Reichold |
| 2,449,620 A | 9/1948 | Reichold |
| 2,451,074 A | 10/1948 | Dean |
| 2,452,881 A | 11/1948 | Vezie |
| 2,454,205 A | 11/1948 | Reichold |
| D152,451 S | 1/1949 | Blakeslee |
| 2,458,640 A | 1/1949 | Reichold |
| 2,460,735 A | 2/1949 | Carroll |
| 2,461,736 A | 2/1949 | Hooper |
| 2,462,349 A | 2/1949 | Battilani |
| 2,464,722 A | 3/1949 | Sacker |
| 2,464,843 A | 3/1949 | Becher |
| D153,493 S | 4/1949 | Blakeslee |
| 2,470,019 A | 5/1949 | Kueser |
| 2,470,323 A | 5/1949 | Smith |
| D154,196 S | 6/1949 | Clark et al. |
| 2,472,955 A | 6/1949 | Myers |
| D154,418 S | 7/1949 | Muller-Munk |
| 2,476,158 A | 7/1949 | Reichold |
| D154,922 S | 8/1949 | Haffner |
| D154,935 S | 8/1949 | Lilja |
| 2,478,787 A | 8/1949 | Smith |
| 2,480,232 A | 8/1949 | Francis |
| D155,288 S | 9/1949 | Hellberg |
| D155,354 S | 9/1949 | Muller-Munk |
| 2,482,940 A | 9/1949 | Ruhnke et al. |
| 2,483,104 A | 9/1949 | Reichold |
| D156,147 S | 11/1949 | Muller-Munk |
| 2,489,785 A | 11/1949 | Kershaw et al. |
| 2,492,865 A | 12/1949 | Huenergardt |
| 2,495,688 A | 1/1950 | Blakeslee |
| 2,495,996 A | 1/1950 | Wolcott, Jr. |
| 2,496,237 A | 1/1950 | Smith |
| D157,363 S | 2/1950 | Frankel |
| D157,428 S | 2/1950 | Richards |
| D157,486 S | 2/1950 | Glowacki |
| D157,545 S | 2/1950 | Temmer |
| 2,496,654 A | 2/1950 | Alsdorf |
| D157,701 S | 3/1950 | Reichart |
| D157,951 S | 4/1950 | Goodman |
| D158,236 S | 4/1950 | Ward |
| 2,504,728 A | 4/1950 | Purpura |
| D158,404 S | 5/1950 | Polan et al. |
| 2,506,013 A | 5/1950 | Columbus |
| 2,507,283 A | 5/1950 | Strother |
| 2,513,593 A | 7/1950 | Smith |
| 2,513,594 A  * | 7/1950 | Snyder ................. 99/292 |
| 2,517,825 A | 8/1950 | Ashcraft |
| 2,528,060 A | 10/1950 | Kershaw et al. |
| 2,537,167 A | 1/1951 | Snyder |
| 2,543,528 A | 2/1951 | Kaufman |
| D162,765 S | 4/1951 | Wohl |
| 2,551,563 A | 5/1951 | Jepson |
| 2,552,420 A | 5/1951 | Frankel |
| 2,553,344 A | 5/1951 | Weeks |
| 2,553,717 A | 5/1951 | Myers |
| 2,555,766 A | 6/1951 | Siczkiewicz, Jr. |
| 2,564,644 A | 8/1951 | Jepson |
| 2,567,187 A | 9/1951 | Davis, Jr. |
| 2,567,188 A | 9/1951 | Davis, Jr. |
| 2,571,015 A | 10/1951 | Columbus |
| 2,571,389 A | 10/1951 | Snyder |
| 2,573,237 A | 10/1951 | Wilcox |
| 2,573,246 A | 10/1951 | Chester |
| 2,576,432 A | 11/1951 | Wilcox |
| 2,577,985 A | 12/1951 | Willman |
| 2,601,067 A | 6/1952 | Spencer |
| D167,454 S | 8/1952 | Games |
| 2,606,490 A | 8/1952 | Columbus |
| D167,794 S | 9/1952 | Budlane et al. |
| 2,619,895 A | 12/1952 | Schott |
| 2,635,783 A | 4/1953 | Frankel |
| 2,651,707 A | 9/1953 | Jepson |
| 2,653,717 A | 9/1953 | Storner |
| 2,657,299 A | 10/1953 | McNairy |
| 2,664,811 A | 1/1954 | Jepson |
| 2,667,565 A | 1/1954 | Wallower |
| 2,667,566 A | 1/1954 | Huck et al. |
| 2,675,754 A | 2/1954 | Huck |
| 2,687,469 A | 8/1954 | Koci |
| 2,692,937 A | 10/1954 | Clark |
| 2,694,769 A | 11/1954 | Huck et al. |
| D173,659 S | 12/1954 | Karlen |
| 2,705,095 A | 3/1955 | Neuman |
| 2,708,398 A | 5/1955 | Mertler |
| D175,086 S | 7/1955 | Mango |
| 2,738,073 A | 3/1956 | Jepson |
| 2,746,376 A | 5/1956 | Hiscock |
| 2,747,740 A  * | 5/1956 | Curtis ................. 210/481 |
| 2,756,667 A  * | 7/1956 | Burns ................. 99/285 |
| 2,780,081 A | 2/1957 | Alexander |
| 2,780,711 A | 2/1957 | Visos |
| 2,797,071 A | 6/1957 | Karlen |
| 2,807,944 A | 10/1957 | Glass |
| 2,820,881 A | 1/1958 | Huck |
| 2,824,509 A  * | 2/1958 | Trogden ................. 99/292 |
| 2,839,661 A | 6/1958 | Visos |
| 2,856,844 A  * | 10/1958 | Price ................. 99/299 |
| 2,864,504 A | 12/1958 | Jepson |
| 2,873,031 A | 2/1959 | Boyce |
| 2,878,940 A | 3/1959 | Jepson |
| 2,885,949 A | 5/1959 | Curtis et al. |
| D186,182 S | 9/1959 | Wickenberg et al. |
| 2,912,921 A | 11/1959 | Ellison |
| D190,247 S | 5/1961 | Binkman et al. |
| 2,982,451 A | 5/1961 | Eisendrath |
| 3,059,822 A | 10/1962 | Eisendath et al. |
| 3,130,663 A | 4/1964 | Wickenberg et al. |
| 3,224,360 A | 12/1965 | Wickenberg et al. |
| D207,659 S | 5/1967 | Schellens |
| 3,334,573 A | 8/1967 | Kanemaru et al. |
| 4,484,514 A  * | 11/1984 | Chen ................. 99/282 |
| 4,721,034 A | 1/1988 | Shimomura |
| 4,742,767 A | 5/1988 | Komatsu et al. |
| 4,793,245 A | 12/1988 | Kimura |
| 4,843,954 A  * | 7/1989 | Henn ................. 99/292 |
| 4,876,953 A | 10/1989 | Imamura et al. |
| 5,892,204 A | 4/1999 | McNair |
| 6,178,874 B1 | 1/2001 | Joergensen |

* cited by examiner

SYSTEM AND METHOD FOR BREWING BEVERAGES

This application claims priority to U.S. Provisional Application No. 60/370,142 entitled "VACUUM COFFEE MACHINE," by Robert C. Hall, Gary L. Waymire, Michael R. Barry, and Shane Washburn, filed Apr. 5, 2002, and to U.S. Provisional Application No. 60/369,275 entitled "VACUUM COFFEE MACHINE," by Robert Hall, filed Apr. 2, 2002, which are hereby incorporated herein by reference.

TECHNICAL FIELD

The present invention relates to systems that rely on suction for brewing beverages; for example, vacuum coffee makers.

BACKGROUND

Beverages such as tea and coffee which rely on steeping and/or brewing to extract flavor from leaves or grounds are popular and prevalent. There are many different systems and many techniques for brewing, producing varying results in texture and flavor. Many of these systems (for example vacuum coffee makers) rely on suction in the brewing process.

In a vacuum coffee maker there are typically two containers, one above the other, with a tube extending down from the bottom of the upper container to the lower container. A filter is placed at the top of the tube and dry coffee grounds are placed on the filter. The lower container is filled with water and the two containers are fitted together such that a seal is formed.

A heating element, either integrally formed with the lower container or placed beneath the lower container, heats the water in the lower container. As the water boils and expands, water and water vapor (steam) are forced up the tube, past the filter, and into the upper container, mixing with the coffee grounds. When the water in the lower container has nearly completely evaporated, the heating element shuts off or current to the heating element is reduced, causing the temperature in the lower container to cool and the pressure to drop, creating suction and drawing water through the filter and into the lower container. The upper container is removed and the coffee is served from the lower container.

There are advantages to brewing systems that rely on suction. Coffee brewed using a vacuum coffee machine is often considered full-bodied without heavy sediment. Water can be poured into a lower container rather than into the upper container. But there are disadvantages as well. For example, the flow of the water up the tube, especially when only a small quantity of water remains in the lower container, can become erratic due to formation of steam bubbles from the heater surface. This leads to intermittent pressurized flow of water upwards through the tube, especially towards the end of the heating cycle. Also, the vacuum coffee machine cannot be used in a compact vertical space. To remove the lower container for serving, the vacuum coffee machine must be disassembled. In order to remove the lower container, the tube must be separated from the lower container. To separate the tube from the lower container, the seal between the upper and lower chambers must be broken and the upper chamber vertically separated from the filter and tube.

BRIEF DESCRIPTION OF THE FIGURES

Further details of embodiments of the present invention are explained with the help of the attached drawings in which.

DETAILED DESCRIPTION

Figure 1:
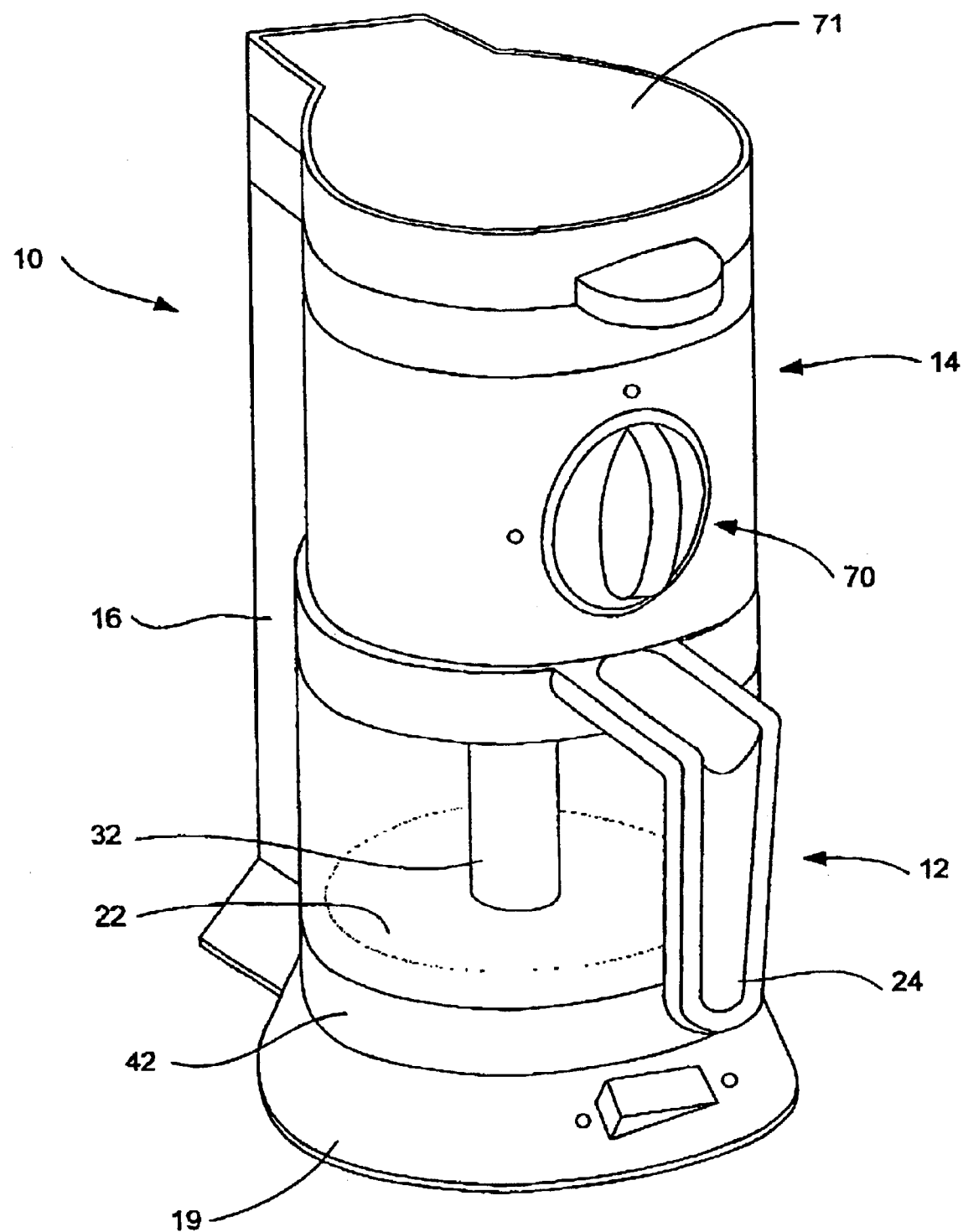
FIG. 1 is a perspective view of an embodiment of the present invention.

FIGS. 1–5 illustrate one embodiment of a system for brewing beverages in accordance with the present invention. As shown in FIG. 1, when assembled for brewing, coffee machine 10 comprises two chambers disposed one atop the other: a lower chamber (or carafe) 12, and an upper chamber (or brew chamber) 14. The carafe 12 and the brew chamber 14 operate together to heat the water and brew the coffee.

The carafe 12 is a vessel for both heating water and storing brewed coffee. The carafe 12 has a storage area defined by a substantially cylindrical side wall 18, a top 20, and a bottom surface 22. In other embodiments, the carafe 12 can be substantially spherical in shape. In still other embodiments, the carafe 12 can be tear-drop shaped. One of ordinary skill in the art can appreciate the different shapes with which the carafe 12 can be formed. The side wall 18 can be made of single-wall glass or stainless steel, evacuated double-wall glass or stainless steel, high density polyethylene, or a material having similar insulating properties. The top of the carafe 20 includes a pour spout 30, and a brew strength adjuster 28 having an opening 26. Extending outward from the top 20 is a handle 24, allowing a user to transport the carafe 12 without touching the wall 18 or base 42 when the carafe 12 contains hot coffee.

Located inside the carafe 12 is a standpipe 32. The standpipe 32 is mounted to a threaded fitting in the brew strength adjuster 28 of the carafe 12. Twisting the brew strength adjuster 28 in a first direction raises the standpipe 32 slightly within the carafe 12. Twisting the brew strength adjuster 28 in a direction opposite the first direction lowers the standpipe 32 slightly within the carafe 12. The standpipe 32 is a tube having a top end 34 and a lower end 36. The standpipe 32 can be circular in cross-section, or alternatively can be elliptical or polygonal in cross-section. The standpipe 32 provides a path for the heated water and steam to travel up towards the brew chamber 14, and a path for the brewed coffee to travel down into the carafe 12.

A vent hole 40 is located on the standpipe 32, above a fill line (not shown) and below the top of the carafe 20. The vent hole 40 relieves air pressure buildup that results from the heating of the water that, in turn, heats the air above the water. The heating of the air in a fixed volume causes the air pressure to rise within the carafe 12. The vent hole 40 allows any pressurized headspace gasses (mostly air, prior to boiling) to escape to the atmosphere by escaping up the standpipe 32, around the brew chamber 14, and into the grounds.

In a typical vacuum coffee machine a slight pressure rise will cause some insufficiently heated water in the carafe 12 to be forced up the standpipe 32 and into the grounds. This "flooding" of the grounds with sub-temperature water prevents accurate timing of the full-immersion brewing step (see below). It also reduces the time-averaged temperature of the water in contact with the grounds. This causes poor taste quality of the coffee.

Figure 5:
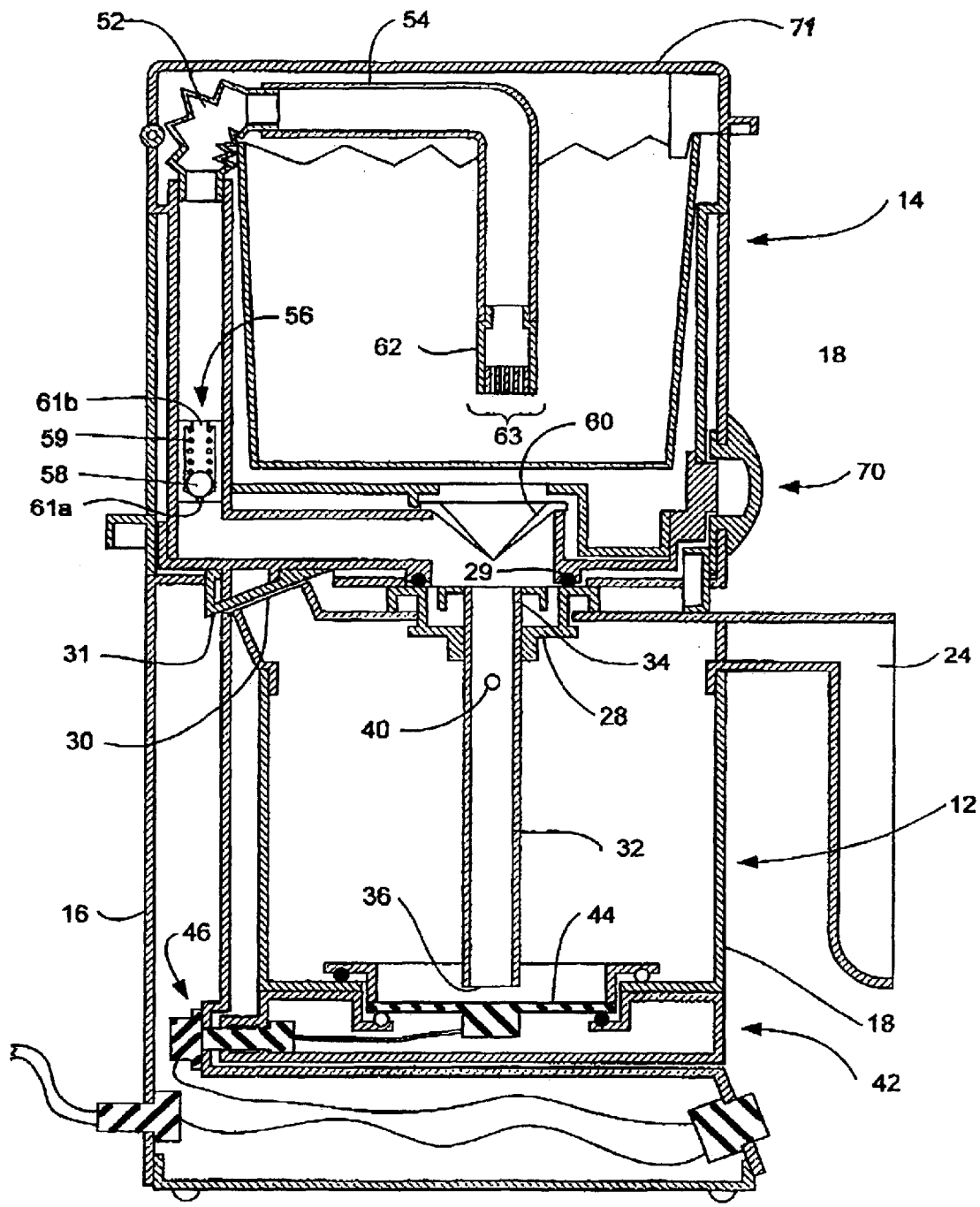
FIG. 5 is a cut-away view of the invention shown in FIG. 1.

The carafe 12 has sealing surfaces proximate to the opening 26 of the brew strength adjuster 28 and the pour spout 30. As shown in FIGS. 5 and 7, the brew strength adjuster 28 forms a seal with o-rings 29 located at the bottom of the brew chamber 14 when the carafe 12 is fully inserted into the housing 16. The pour spout 30 forms a proximity seal, with a surface 31 of the brew chamber 14 substantially parallel to the slope of the pour spout 30. In other embodiments, the spout 30 has an end cap or retractable cover or similar sealant means. The only path connecting the interior of the carafe 12 to the brew chamber 14 is through the standpipe 32.

The base 42 of the carafe 12 also contains an integral heater 44. The heater 44 electrically heats and boils the water within the carafe 12, and keeps the brewed coffee warm when it returns to the carafe 12. An electrical connection is made for the heater 44 when the carafe 12 is slid into the main housing 16. A "docking" type electrical connector 46 is used similar to those used on cordless clothes irons. In other embodiments, the carafe 12 can be plugged into an electrical outlet using a cord. In still other embodiments, the heater 44 can be powered by a battery, allowing for portability. One of ordinary skill in the art can appreciate the different methods for powering the heater.

The base 42 of the carafe 12 maybe detached from the body of the carafe 12. This allows economical replacement of a damaged body without having to also replace the base 42. For example, if the glass wall 18 breaks, the base 42 can be removed from the carafe 12. A user can buy a new carafe 12 without a base 42 and connect the original base 42 to the new carafe 12.

All flow into the carafe 12 and out of the carafe 12 during the brewing process must travel through the standpipe 32. The brew chamber 14 splits the standpipe flow-path into two parts: a "fill and brew" path and an "aspiration" (or output) path. The "fill and brew" path travels around and above the filter 48 to direct boiled water and steam into the grounds within the filter 48. The "aspiration" path extends from just below the filter 48 in the bottom of the brew chamber 14 to the standpipe 32. Each flow-path contains a check valve to cause the proper direction of the flows in sequence depending on whether the pressure is positive or negative (partial vacuum) within the carafe 12.

The "fill and brew" path comprises a first flow tube 50, a flexible connector 52, and a second flow tube 54. The first flow tube 50 includes a check valve 56 located at the end of the first flow tube 50. The check valve 56 in the "fill and brew" path is oriented to allow boiled water and steam to move from the carafe 12, up the standpipe 32, around the filter 48, and down into the pile of grounds. As shown in FIG. 5, the check valve 56 can be a ball 58 within a cavity 59 having an opening 61a and 61b on each end. The diameter of each opening 61a and 61b is smaller than the diameter of the ball 58, allowing the ball 58 to travel only within the cavity 59. The check valve's orientation prevents aspiration of filter contents when a partial vacuum is formed in the carafe 12 by the cessation of boiling. In most systems, the check valve 56 has a forward pressure drop of less than two inches of water at the flow rates produced by the boiling in the carafe 12.

The reverse flow resistance created by the check valve 56 prevents the filter's interior contents from being aspirated into the carafe 12 during the "suck-back" phase of the brewing cycle, thereby preventing grounds and sediments from being drawn into the carafe 12. To accomplish this, the ball 58 forms a seal with the opening 61a when the ball 58 is at its lowermost position (see FIG. 5). This seal prevents water or steam containing coffee grounds from traveling back into the carafe 12. The check valve 56 also has a minimum hysteresis in order to produce a steady flow of steam into the grounds/water mixture in the brew chamber 14, preventing messy surges or bursts.

The check valve 60 in the "aspiration" (or output) path is oriented to allow filtered coffee from the brew chamber 14 to be sucked down into the carafe 12 by the partial vacuum formed when the boiling is stopped. When a partial vacuum develops in the carafe 12, the check valve 60 opens and allows a high flow rate of the finished coffee into the carafe 12 through the standpipe. The check valve's orientation prevents boiled water or steam from moving up the carafe 12 toward the bottom of the filter 48 during the brew chamber filling process. Boiled water or steam moving in this direction does not mix properly with coffee grounds and can upset or deform the filter 48, spilling the contents such that the carafe 12 is contaminated. In most systems, the maximum back-pressure on the valve 60 is less than ten inches of water.

The check valves 56 and 60 can be standard, one-way valves that offer low resistance to flow in one direction and block reverse flow. Such valves only allow fluids to move one direction through a pipe or duct. Check valves are common, simple, low-cost, and available in many different styles, sizes, and materials. For example, in other embodiments, the first flow tube 50 can include a tilt-disc check valve. In still other embodiments, the first flow tube 50 can include a flapper valve.

When the water in the carafe 12 reaches a full boil, the volume of steam created by the full boiling "overwhelms" the standpipe vent hole 40; that is, the vent hole 40 can no longer prevent the pressure from rising in the headspace of the carafe 12. Hot water from the carafe 12 is forced up the standpipe 32, through the first and second flow tubes 50 and 54 and down through the nozzle 62 into the midst of the coffee grounds in the filter 48. As the boiling water level in the carafe 12 drops below the lower end 36 of the standpipe 32, a high volume of steam begins escaping up through the now-open bottom end 36 of the standpipe 32, through the path-way around the filter, and is released by the nozzle 62 into the mixture of boiled water and grounds. The steam bubbles up through the mixture, keeping the mixture from cooling and agitating the mixture for an ideal full-immersion brew.

This "steam powered" heating and mixing process continues until substantially no more water is left in the carafe 12. The length of time for this mixing process depends on the volume of water left in the carafe 12 at the time of the "unporting" of the lower end 36 of the standpipe 32. By twisting the brew strength adjuster 28 and adjusting the height of the lower end 36 of the standpipe 32 above the bottom of the carafe 12 (i.e. the heater 44), the mixing time can be adjusted.

Typically the upper brew chamber contains the standpipe. When the brew chamber is mated to the top of the boiling chamber/carafe, the standpipe must be inserted down into the neck of the carafe. This requires the vertical separation of the brew chamber from the carafe by an amount equal to the length of the protruding standpipe. A minimum of vertical movement of the brew chamber is required because of consumer space requirements. By making the standpipe 32 part of the carafe 12, no part of the brew chamber 14 protrudes into the carafe 12. Only a few millimeters of vertical motion by the brew chamber 14 relative to the carafe 12 is needed for seal operation. For seal operation during the latching/releasing process, the brew chamber 14 moves up and down a few millimeters relative to the carafe 12. The housing 16 includes a latch 70 that can be rotated to place the vacuum coffee maker 10 into a locked "brew" position (shown in FIG. 1) or an unlocked position (shown in FIG. 2) so that the carafe 12 can slide into the housing 16 or out of the housing 16. When the carafe 12 is slid into the housing 16, the mating surfaces, or o-rings 29, are not compressed against the brew strength adjuster 28 and no seal is formed. By rotating the latch 70 to the "brew" position, the brew chamber 14 will move towards the carafe 12 so that the o-rings 29 compress against and form a seal with the brew strength adjuster 28.

Figure 2:
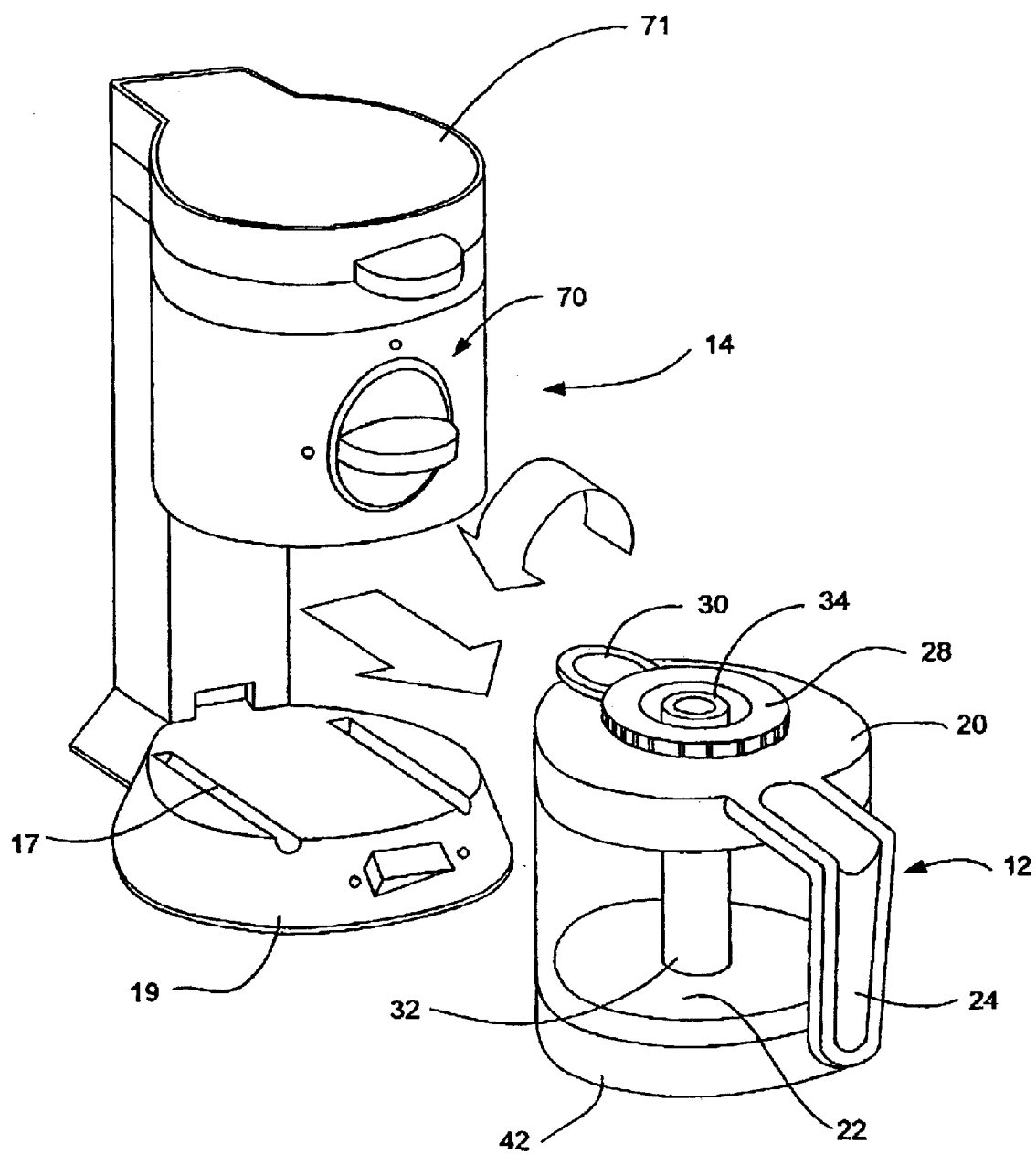
FIG. 2 is a perspective view of the invention shown in FIG. 1 illustrating separation of a carafe and a brew chamber.
Figure 3:
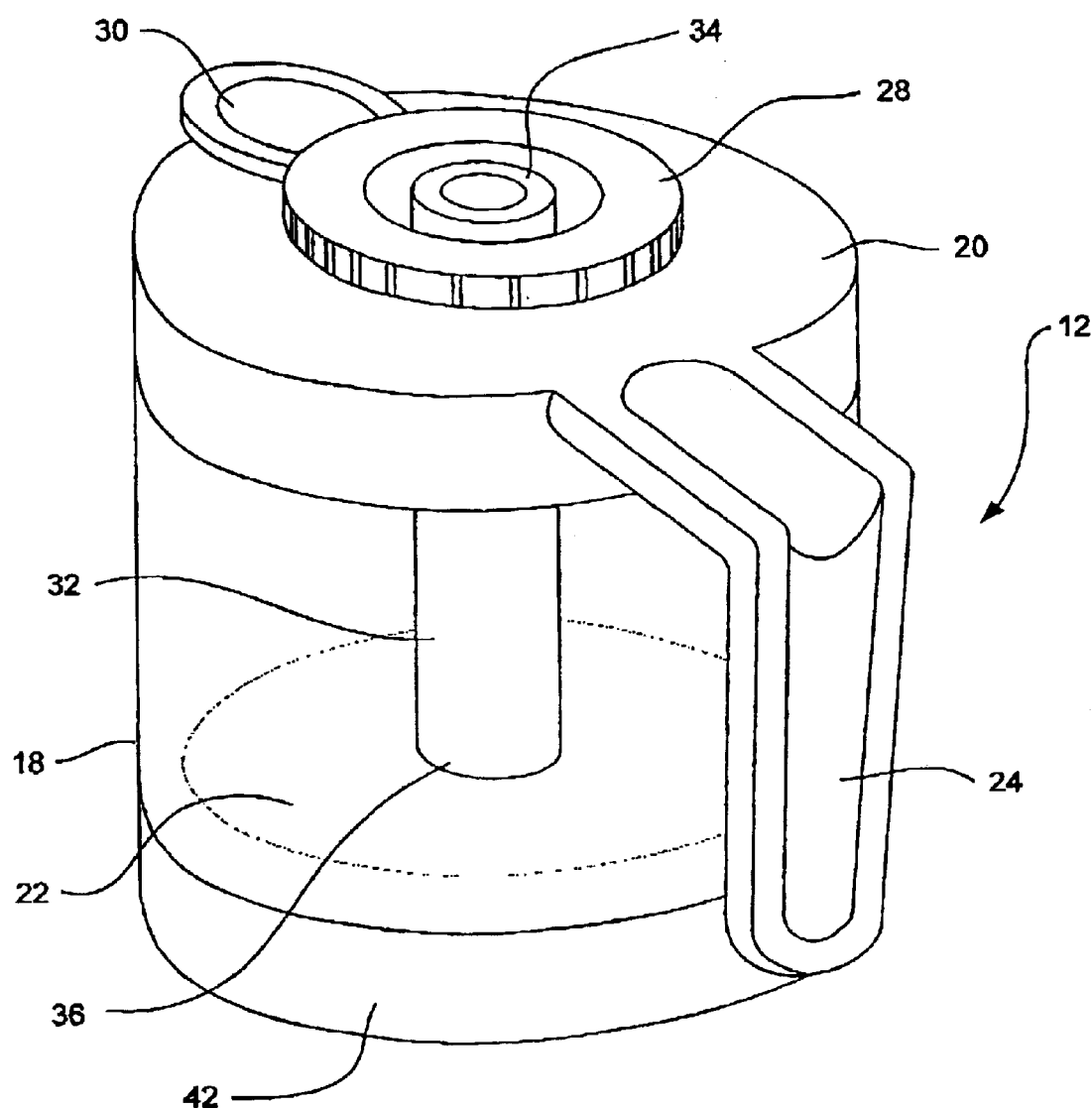
FIG. 3 is a perspective view of the carafe shown in FIG. 2.
Figure 4:
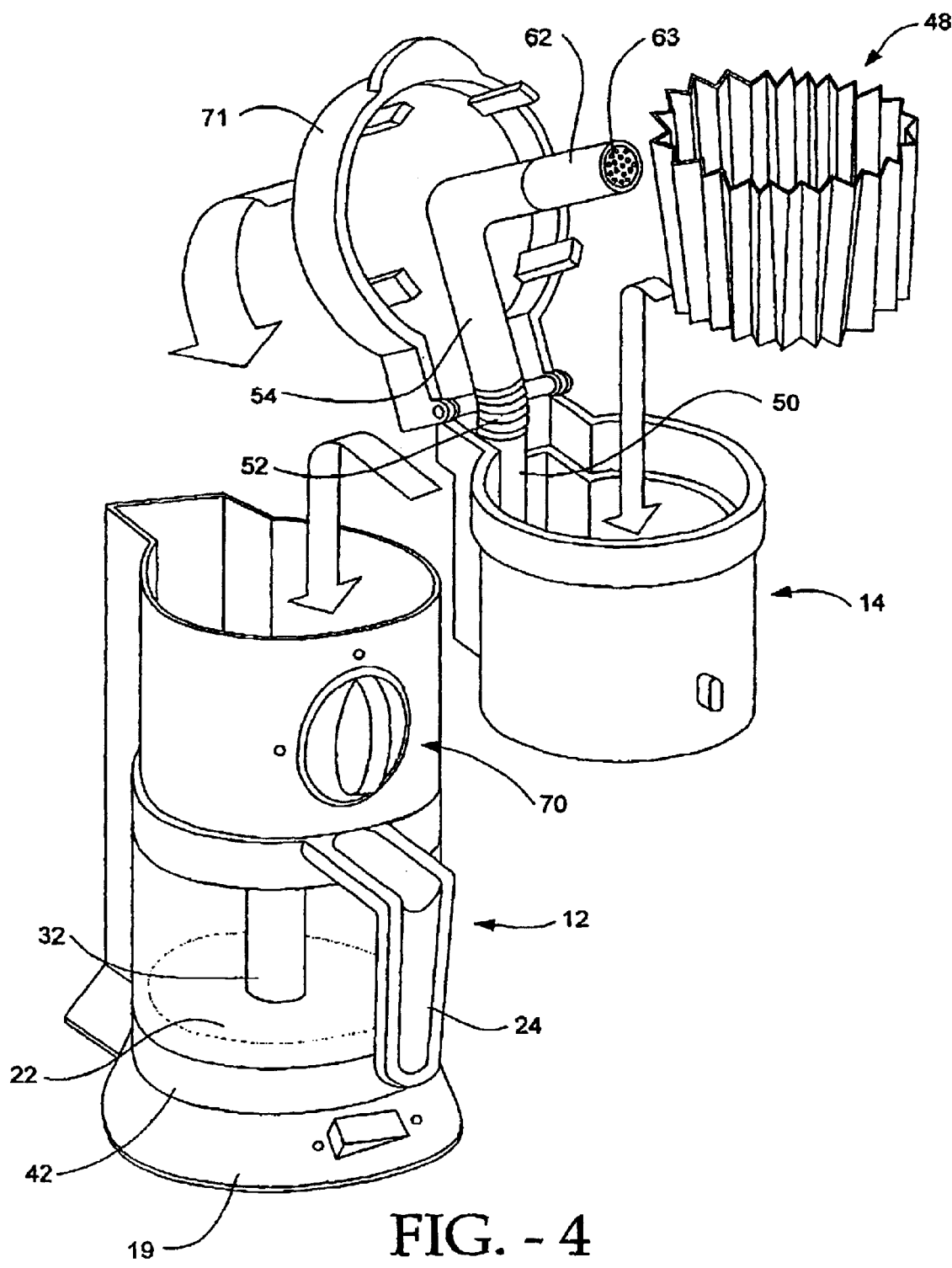
FIG. 4 is a partial assembly view of the invention shown in FIG. 1 illustrating several components of the brew chamber.

The slight vertical movement of the brew chamber 14 allows joining the brew chamber 14 and carafe 12 by sliding the carafe 12 horizontally under the brew chamber 14. A horizontal, or substantially horizontal sliding motion of the carafe 12 provides for easy operation of the system by a consumer. FIG. 2 illustrates two horizontal grooves 17 located in the base 19 of the housing 16 for aligning the seals of the carafe 12 with the brew chamber 14. The base 42 of the carafe 12 has two complimentary protrusions that engage and slide within the grooves 17. In other embodiments, the carafe 12 and brew chamber 14 can be aligned using tracks or grooves located on the upper surface of the carafe 12 and lower surface of the brew chamber 14. One of ordinary skill in the art can appreciate the different configurations allowing for the two chambers to be aligned.

The tip 63 of the nozzle 62 contains an array of openings 65 that are sized and shaped to properly release the water and steam into the mixture of grounds and water. There is a risk of splashing and spilling grounds outside the filter 48. To prevent this, the openings 65 in the nozzle 62 are large enough to prevent fine bubbles that can produce foam in the mixture, but small enough to act as diffusers, preventing large bubbles from forming that can produce messy slops and bursts from the surface of the mixture.

The dual flow path system allows the use of a filter 48 that completely contains the grounds' for easy disposal after use. This type of filter is called a "basket filter." The single flow path of other vacuum-type coffee brewers does not allow the use of convenient basket filters, because boiled water cannot be pushed up a single flow path through the bottom of a paper filter. The boiled water must be ducted through a flow path around the filter 48 and released into the filter 48 from above. However, to prevent contaminating the coffee with grounds, the flow path around the filter 48 (through first and second flow tubes 50 and 54) cannot be used for aspiration of the coffee into the carafe 12; therefore, the "aspiration" flow path is required to draw the coffee through the filter and into the carafe 12.

In one embodiment, the brew chamber lid 71 includes tabs or fingers mounted to the underside of the lid 71 for retaining the upper edge of the filter 48 when the lid 71 is closed, thereby holding the filter 48 in its "basket" shape throughout the brewing process. This avoids spillage of grounds that could contaminate the finished coffee.

When the latching sealing means is deactivated, the carafe 12 is freed from the upper chamber 14. The carafe 12 can then be slid out horizontally for use as a serving pitcher. A horizontal sliding motion of the carafe 12 provides for easy, intuitive operation of the system by the consumer.

Operation

After placing coffee grounds into the filter 48, filling the carafe 12 with water to the desired level and placing the carafe 12 back into the housing 16, a user turns the heater 44 to the "full hot" position. The water begins to heat and the pressure of the air in the headspace above the water in the carafe 12 starts to increase. The partial pressure of the steam in the headspace increases with the rising temperature of the liquid water. The vent hole 40 acts as a vent to relieve this slow, early buildup of air and steam pressure. The water in the carafe 12 begins to boil.

The amount of steam produced by the full boil cannot be vented fast enough by the vent hole 40 in the standpipe 32 and the pressure in the carafe 12 rises rapidly. The rapidly rising pressure forces the boiling water up the standpipe 32. The water travels through the "fill and brew" check 56 valve in the manifold, up around the filter through the second flow tube 54, and down through the nozzle 62 into the grounds in the filter. The water pouring out of the nozzle 62 is just below the boiling point.

As the water level in the carafe 12 drops below the lower end 36 of the standpipe 32, a high volume of steam begins escaping up the standpipe 32. The steam travels through the pathway around the filter (first and second flow tubes 50 and 54), and is released by the nozzle 62 into the mixture of boiled water and grounds. The steam bubbles up through the full immersion mixture of water and grounds, agitating the mixture and keeping the mixture from cooling. This "steam powered" heating and mixing process continues until very little or no water is left in the carafe 12. The length of time for the mixing process depends on the volume of water left in the carafe 12 at the time of the "unporting" of the lower end 36 of the standpipe 32. By twisting the brew strength adjuster 28 and adjusting the height of the lower end 36 of the standpipe 32 above the bottom of the carafe 12, the mixing time can be adjusted. When the boiling water level finally drops below a certain point exposing some or all of the heat transfer surface(s), a temperature rise is sensed in the heating element or in some other part of the heat transfer surfaces thermally connected to the heater 44. The heater 44 tuns off, or the current to the heater 44 is reduced, and the boiling stops.

By this time there is little or no air left in the carafe 12. The carafe 12 is filled with steam. When the boiling stops, the steam condenses to a fraction of its gaseous volume and creates a strong partial vacuum in the carafe 12. The partial vacuum forcefully pulls the brewed coffee in the upper chamber 14 through the filter and down through the drain check valve 60 and into the carafe 12. The grounds are left inside the basket filter. Finally, a user can release the latching sealing means, freeing the carafe 12 from the upper chamber 14. At that point, the carafe 12 can be slid out for use as a serving pitcher.

In other embodiments, the brewing system described herein can be used for brewing tea, or other brewed beverages. The present invention should not be construed as being limited to brewing coffee.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A two-chamber brewing system comprising:
    a first chamber adapted for holding a filter and capable of receiving and expelling a fluid;
    wherein the first chamber is connected with a frame having a pedestal to position the second chamber such that a sealing surface of the first chamber can be brought into contact with the second chamber so that the standpipe is isolated from atmosphere;
    wherein the pedestal includes one of grooves and tracks to align the sealing surface with the standpipe; and
    a second chamber capable of creating a pressure differential between the first chamber and the second chamber, the second chamber having a heated base and a standpipe to allow fluid to flow between the first chamber and the second chamber;
    wherein the second chamber includes one of tracks and grooves to engage the one of grooves and tracks of the pedestal.

2. A two-chamber brewing system, comprising:
    a first chamber adapted for holding a filter and capable of receiving and expelling a fluid;
    wherein the first chamber is connected with a frame having a pedestal to position the second chamber such that a sealing surface of the first chamber can be brought into contact with the second chamber so that the standpipe is isolated from atmosphere; and
    a second chamber capable of creating a pressure differential between the first chamber and the second chamber, the second chamber having a heated base and a standpipe to allow fluid to flow between the first chamber and the second chamber;
    wherein the frame includes a latch to bring the sealing surface of the first chamber into contact with the second chamber.

3. The two-chamber brewing system of claim 2, wherein when the chambers are unlatched such that the sealing surface of the first chamber does not contact the second chamber, the second chamber is adapted to be disengaged from the pedestal and used as a serving pitcher without adjusting the first chamber.

4. A system for brewing beverages, comprising:
    a brewing chamber adapted to hold a filter;
    a pressurizable container adapted to hold a fluid; and
    a standpipe positioned within the pressurizable container to allow the fluid to flow between the brewing chamber and the pressurizable container;
    wherein the brewing chamber is adapted to receive the fluid from a nozzle positioned within the filter and to expel the fluid through a check valve positioned below the filter;
    wherein the check valve is opened when a pressure in the pressurizable container drops below a pressure in the brewing chamber.

5. The system for brewing beverages of claim 4, wherein the standpipe includes a vent hole.

6. The system for brewing beverages of claim 5, wherein the pressurizable container includes a heated base to heat the fluid within the pressurizable container.

7. The system for brewing beverages of claim 6, wherein the pressurizable container is capable of forming a partial vacuum.

8. The system for brewing beverages of claim 7, wherein the brewing chamber is connected with a housing having a pedestal to position the pressurizable container such that a sealing surface of the brewing chamber is capable of being brought into contact with the pressurizable container so that the standpipe is isolated from atmosphere.

9. The system of brewing beverages of claim 8, wherein when the sealing surface of the brewing chamber does not contact the pressurizable container, the pressurizable container is adapted to disengage the pedestal and using as a serving pitcher without adjusting the brewing chamber.

10. The system for brewing beverages of claim 8, wherein the heated base of the second chamber includes a heater element;
    wherein the housing has an electrical outlet for engaging the heated base such that power is provided to the heater element.

11. The system of claim 4, wherein the standpipe is adjustably connected with the pressurized container such that a vertical space between a bottom end of the standpipe and the base can be increased or decreased.

12. The system of claim 4, wherein said pressurizable container can be removed from the system without removing the standpipe from the pressurizable container.

13. A system for brewing beverages comprising:
    a brewing chamber adapted to hold a filter, the brewing chamber having:
        a first pathway adapted to receive a fluid, the first pathway having a first check valve and a nozzle positioned above the filter; and
        a second pathway adapted to expel the fluid, the second pathway having a second check valve below the filter;
    a pressurizable container adapted to hold the fluid; and
    a standpipe positioned within the pressurizable container to allow the fluid to flow between the brewing chamber and the pressurizable container;
    wherein the second check valve is adapted to open when a pressure in the pressurizable container drops below a pressure in the brewing chamber to allow the fluid to flow through the second pathway and the standpipe into the pressurizable container;
    wherein said pressurizable container can be removed from the system without removing the standpipe from the pressurizable container.

* * * * *